3,319,063
PROCESS FOR PURIFYING COLLOIDAL PARTI-
CLES FOR SUBSEQUENT STRUCTURAL ANALY-
SIS WITH AN ELECTRON MICROSCOPE
Gerson L. Ram, Cedar Grove, and Robert G. Salamon,
Bloomfield, N.J., assignors to The Board of Trustees
of Schools for Industrial Education of Newark, New
Jersey, Administering Newark College of Engineering,
Newark, N.J., a public corporation of New Jersey
No Drawing. Filed July 15, 1964, Ser. No. 382,933
11 Claims. (Cl. 250—49.5)

This invention relates to the process of obtaining the fundamental basic structure of colloidal particles and in particular of colloidal protein particles.

All life is dependent upon colloids. The proteins of all living protoplasm are colloidal in nature. Every cell of the human body is a colloidal complex of an unknown character, cosmic in nature and virtually limitless in its secret store of knowledge. The blood, nerve cells, and the muscles are all examples of colloidal matter.

Besides the biological implications in disease and the maintenance of life and health, colloids are important in industry. Such industries as the antibiotic pharmaceutical industry, brewing, dairy, mining, agriculture, food technology, leather, and plastics are all dependent for their success on the increased knowledge of colloidal technology.

The determination of the structure of colloids has been an objective for over a century, since knowledge of the structure of the colloids makes possible development of new compounds and synthesizing compounds and chemicals and particularly organic chemicals and more specifically the basic building blocks of living matter, namely proteins.

In 1861 Graham, the father of colloid chemistry, first successfully demonstrated dialysis or retention of colloidal particles by membranes. Subsequently, Svedberg, Nobel Prize winner of 1928, invented the ultracentrifuge by which it was possible to obtain by artificially inducer gravitational fields, an approximate particle weight for colloidal protein substances.

Svedberg's student, Arne Tiselius, Nobel Prize winner, in 1946 developed the electrophoresis apparatus which remedied an important defect in the Svedberg procedure. Svedberg had depended solely on mass separation. Tiselius evolved information showing that the colloid protein particles possessed not only mass but a surface electrical charge which could be utilized for separating purposes.

Of parenthetical interest, Sanger, Nobel Prize winner in 1961 did a great deal of structure investigation in the protein field and in the determination of the probable structure of insulin, a colloid protein necessary for carbohydrate metabolism.

Watson and Crick, Nobel Prize winners in 1963, further did work in structural formulation of various colloidal proteins involved in hereditary transmission of biological characteristics.

In all instances referred to above, resort has been made to probability studies in conjunction with the classical quantitative destructive proteolytic chemistry. No direct approach to the study of protein colloid structure was available. The development of the Ram-Salamon colloid mobilometer-densitiometer Patent No. 3,135,816 of June 2, 1964, has furthered the progress of colloidal structure determination.

It is an object of this invention to enable one to directly determine the fundamental colloid particle structure heretofore unobtainable.

It is a further object of this invention to provide a process which enables chemists, biologists and the like, to obtain basic information on colloids and related compounds.

Another object of this invention is to provide a method for determining the fundamental building blocks of nature which permits recordation for future use purposes.

These and other objects of this invention will be apparent from the following description as hereinafter set out:

The principles of the new direct attack on the problem of the nature of fundamental colloidal particle structure as applied in this invention involves the utilization of the following steps applied in sequence:

(1) A highly purified, separated, ion-free, dialysed colloid particle suspension is initially spread out in a colloid cell chamber to obtain graded separation with respect to mass and charge.

(2) The chamber is refrigerated to approximately 0° C. by maintaining the apparatus in a bath of methyl Cellosolve or a similar low freezing temperature solvent.

(3) The chamber is maintained vibration free through closely controlled electronic equipment. Suitable equipment of this general type is manufactured under the trademark Isomode by the MB Manufacturing Company of New Haven, Conn. Alternatively a gyro stabilized vibration isolation system can also be used. Systems of this type are manufactured by the Sperry Corporation. The system should also afford a constantly adjustable electrostatic field strength.

(4) After the colloidal particles are spread out in a graded manner according to mass and charge, and maintained vibration free, they must be rapidly frozen to a very low temperature of approximately −80° C. Methyl Cellosolve and solid carbon dioxide may be the refrigerant in this instance.

(5) Subsequent to the rapid freezing, the chamber or cell is then subjected to an extremely low vacuum and the water in the chamber and in the protein distilled out by sublimation from the solid state. This procedure will leave an adherent layer of separated, adjacent, purified crystal, colloid protein particles lined up in the manner established by their electrophoretic mobility.

(6) Recording apparatus including microphotographic equipment such as Polaroid records taken by a repeated series of Polaroid photographs record, the lined up protein particles through a scanning apparatus associated with the cell or chamber while the particles are maintained under the extremely low vacuum. The use of great magnification of modern stream electron microscopy is essential in this step.

Summary

The resulting photographs may be considered somewhat analogous to the Von Laue crystal structure patterns evolved from inorganic crystalline bodies. By amplification of the electron stresses in the vacuum apparatus described, it is possible to go far beyond the limits of Von Laue in inorganic crystals and Tiselius in electrophoresis apparatus. Heretofore no direct physical method to solve the problem of basic cell structure has been devised and the present invention enables one to obtain basic structural colloidal configurations.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features herein before set forth and as fall within the scope of the invention or the limits of the appended claims.

Having thus described our invention, what we claim is:
1. The method of obtaining the fundamental basic structure of colloidal particles including the steps of:
  (a) purifying a colloidal suspension to obtain separated ion free particles
  (b) spreading the particles out in a cell chamber refrigerated by a suitable refrigerant to approximately 0° C. and grading as to mass and surface charge by electrophoresis apparatus
  (c) maintaining said particles in a vibration free condition
  (d) maintaining a closely controlled constant adjustable electrostatic field strength to said chamber
  (e) applying an extremely low vacuum to said chamber
  (f) distilling said water from said particles by sublimation from the solid state so as to form a layer of adjacent purified crystal particles aligned according to their electrophoretic mobility, and
  (g) photographing under vacuum by electron microscopy the lined up particles.
2. The method of claim 1 and wherein said colloidal particles are protein particles.
3. The method of claim 1 and wherein
  (a) said refrigerant is selected from the group consisting of
    (A) methyl Cellosolve
    (B) solid $CO_2$
4. The method of claim 1 further including the step of freezing said spread out particles at approximately —80° C. after they are graded and maintained in said vibration free condition.
5. The method of claim 1 wherein, in step (g) photographing under vacuum is by a Polaroid photographing step.
6. The method of claim 1, wherein, in step (a) purifying to obtain separated ion free particles is by dialysis.
7. The method of claim 1, wherein, in step (g) the photographing under vacuum is by stream electron microscopy.
8. The method of claim 1, wherein, in step (g) the lined up particles are photographed while their image is magnified.
9. The method of claim 1 wherein, in step (g) photographing under vacuum is by stream electron microscopy, while the image formed by said electron stream is magnified.
10. The method of claim 1, wherein, in step (g) photographing under vacuum is a Polaroid photographing step, by stream electron microscopy and while the image formed by said electron stream is magnified.
11. The method of claim 1 wherein, in step (f), the distilling of said water from said particles by sublimation from the solid state is at approximately —80° C.

References Cited by the Examiner

Alexander's Colloid Chemistry, vol. V, Reinhold Publishing Co., January 1944, pp. 152, 180, and 181.

RALPH G. NILSON, *Primary Examiner.*

A. L. BIRCH, *Assistant Examiner.*